United States Patent
Schlosser et al.

(10) Patent No.: US 7,681,393 B2
(45) Date of Patent: Mar. 23, 2010

(54) HYDROSTATIC DRIVE AXLE WITH TWO HYDROSTATIC AXIAL PISTON MOTORS UTILIZING A SWASHPLATE DESIGN LOCATED NEXT TO EACH OTHER

(75) Inventors: Robert Schlosser, Waldaschaff (DE); Peter Staudt, Aschaffenburg (DE)

(73) Assignee: Linde Material Handling GmbH, Aschaffenburg (DE)

( * ) Notice: Subject to any disclaimer, the term of this patent is extended or adjusted under 35 U.S.C. 154(b) by 226 days.

(21) Appl. No.: 11/895,024

(22) Filed: Aug. 22, 2007

(65) Prior Publication Data
US 2008/0072591 A1   Mar. 27, 2008

(30) Foreign Application Priority Data
Sep. 6, 2006   (DE) ................. 10 2006 041 861

(51) Int. Cl.
*F16D 31/02* (2006.01)
*F01B 13/04* (2006.01)
(52) U.S. Cl. ............................................. 60/485; 92/57
(58) Field of Classification Search .................. 60/485; 180/308; 92/57
See application file for complete search history.

(56) References Cited

U.S. PATENT DOCUMENTS

| | | | | | |
|---|---|---|---|---|---|
| 1,136,363 | A | * | 4/1915 | Pepper | 60/485 |
| 1,227,055 | A | * | 5/1917 | Kellogg | 60/485 |
| 3,200,593 | A | * | 8/1965 | Kuze | 60/485 |
| 3,209,538 | A | * | 10/1965 | Kuze | 60/485 |
| 3,293,848 | A | * | 12/1966 | Kuze | 60/485 |
| 7,431,122 | B2 | * | 10/2008 | Iwaki et al. | 180/308 |

FOREIGN PATENT DOCUMENTS

DE   10303636 A1   8/2004

* cited by examiner

*Primary Examiner*—Michael Leslie
(74) *Attorney, Agent, or Firm*—The Webb Law Firm

(57) ABSTRACT

A hydrostatic drive axle has two hydrostatic axial piston motors utilizing a swashplate design located coaxially next to each other, the control sides of which face each other. Tubular terminal segments (1a) of the drive axle are in the form of axial piston motors (2) and are shaped and fitted on a center segment (1b), in which there is a control base seat (3) that is common to the two axial piston motors (2). To make possible easy assembly and disassembly, the control base seat (3) is shaped and fitted in the center segment.

5 Claims, 3 Drawing Sheets

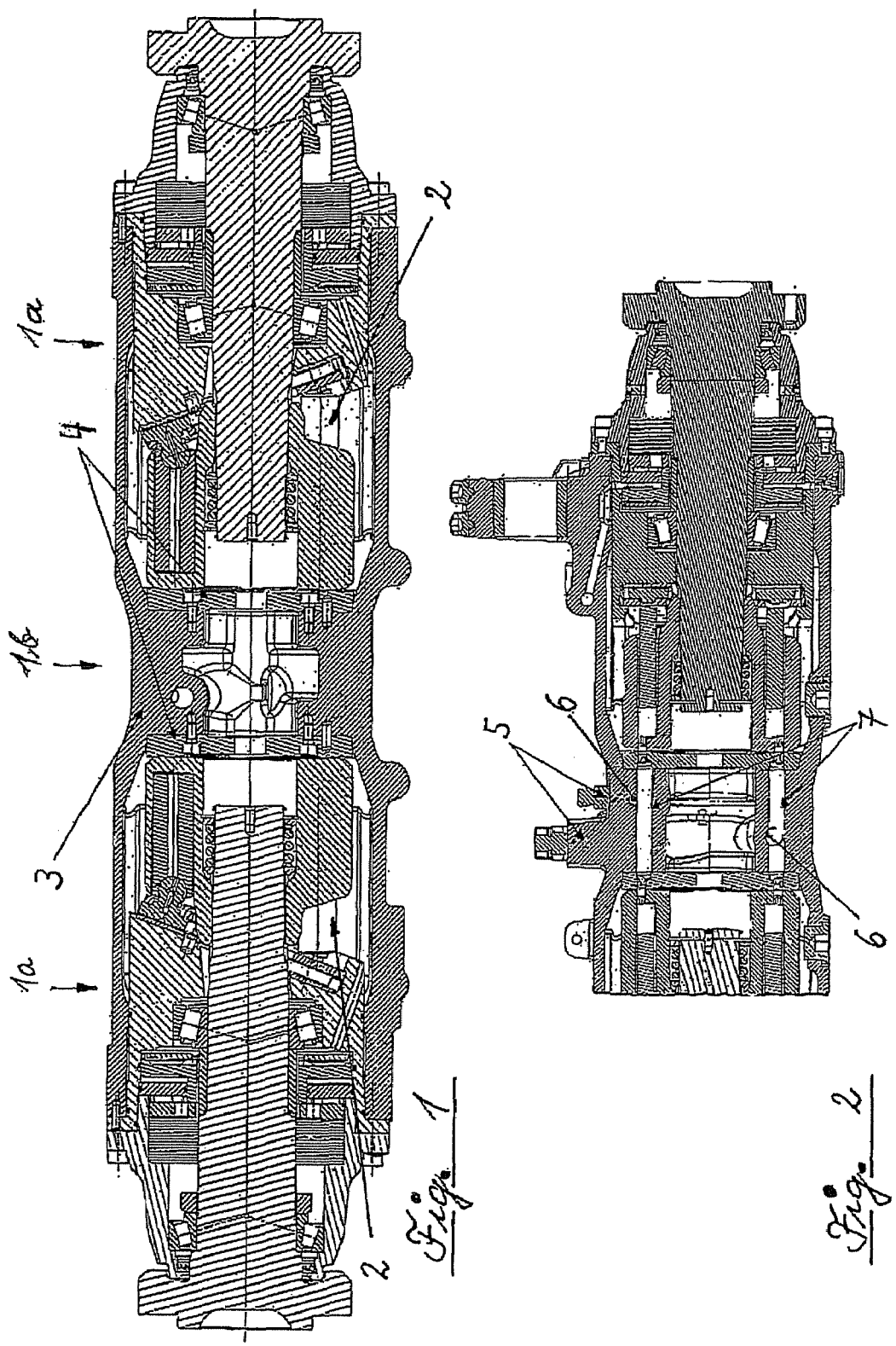

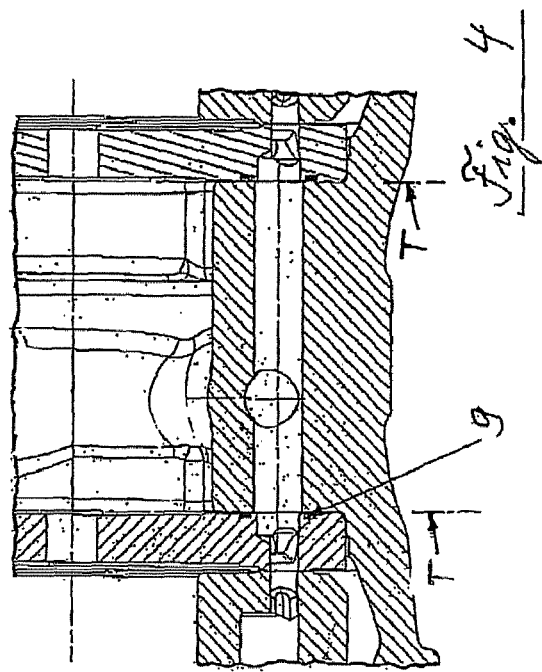
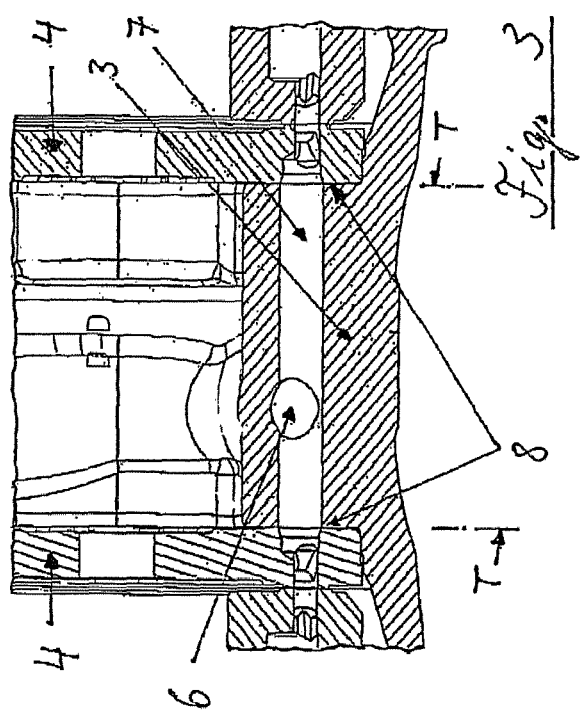
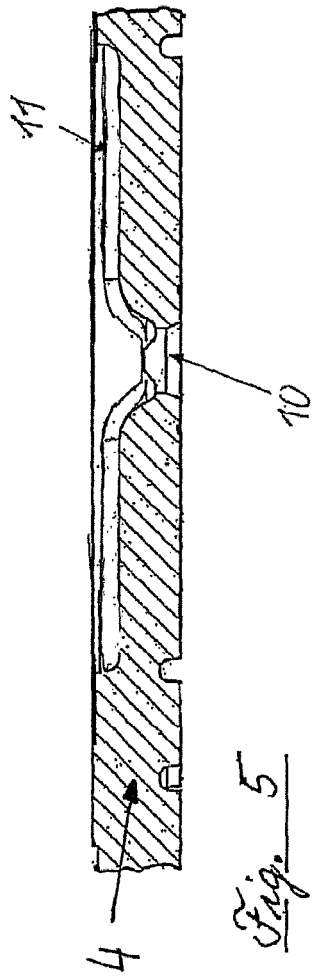

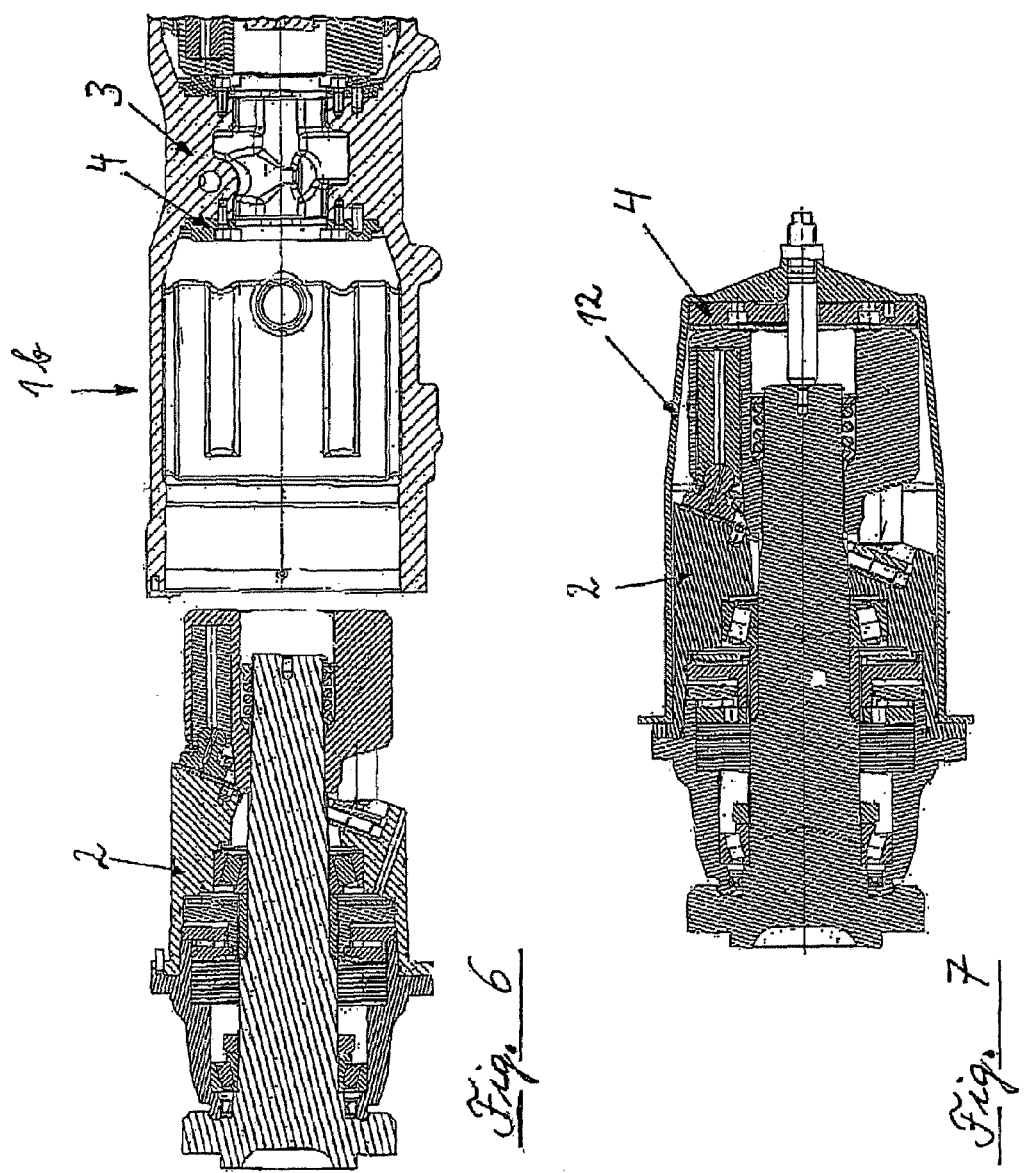

US 7,681,393 B2

HYDROSTATIC DRIVE AXLE WITH TWO HYDROSTATIC AXIAL PISTON MOTORS UTILIZING A SWASHPLATE DESIGN LOCATED NEXT TO EACH OTHER

CROSS REFERENCE TO RELATED APPLICATION

This application claims priority to German Application No. 10 2006 041 861.1, filed Sep. 6, 2006, which application is herein incorporated by reference in its entirety.

BACKGROUND OF THE INVENTION

1. Field of the Invention

This invention relates to a hydrostatic drive axle with two hydrostatic axial piston motors utilizing a swashplate design located next to each other, the control sides of which are facing each other. Tubular terminal segments of the drive axle are in the form of housings for the axial piston motors and are shaped and fixed on a center segment in which there is a common control base mounting for both axial piston motors.

2. Technical Considerations

A generic drive axle is described as one of two exemplary embodiments in DE 103 03 636 A1. In that case, the individual components of the drive axle are located in a load-bearing axle tube and are fastened in the axle tube. The two axial piston motors are supplied with hydraulic fluid through channels in a three-part control base seat, the components of which are inserted individually into the center segment of the drive axle, where they are connected with one another. As a result of which, the control base seat is simultaneously fastened inside the drive axle. The control base seat is secured against rotation by hydraulic connection sockets oriented radially and are inserted from outside through the axle tube through radial recesses in the center piece of the control base seat.

Mounted one on each side of the control base seat are disc-shaped, relatively thin control bases into which control nodules are incorporated, which interact in a known manner with the cylinder blocks of the two axial piston motors.

It is an object of the invention to provide a drive axle of the general type described above but in which the construction and installation are simplified.

SUMMARY OF THE INVENTION

The invention teaches that the control base seat is shaped and fixed in one piece in the center segment. The number of parts is thereby reduced and the fabrication and assembly of the drive axle is simplified.

In one particularly advantageous configuration of the invention, the center segment is provided with common hydraulic connections for the two axial piston motors, whereby each of the hydraulic connections is connected to at least one transverse boring in the control base seat that connects the axial piston motors in parallel with each other. And, on both ends of each transverse hole, there is a control base channel that is aligned with the transverse boring and transitions into a control nodule and, together with the control nodule, is incorporated into a control base which is held on the control base seat.

The fluid distribution in the drive axle therefore takes place via simply manufactured transverse borings that are connected with the hydraulic connections and are incorporated into the control base seat. The transition between the control base channels which are aligned with and connected to the transverse borings and the control nodules occurs in the control bases. For this purpose, the control bases have thicker walls than the relatively thin control base of the known drive axle.

The invention teaches that it is advantageous if there are sealing means in the separation planes between the control base seat and the control bases. In the simplest case, these seals can be metal seals across a gap, i.e., the surfaces of the assemblies that are in contact with one another are machined so that as little fluid as possible flows out of the gap. It is also possible, however, to use seals made of a soft material such as O-rings, for example.

The control bases are advantageously detachably fastened to the control base seat. The fastening can be accomplished by threaded connections, as well as in combination with centering pins.

In one particularly advantageous development of the invention, the axial piston motors are pre-assembled modules, each of which has a drive assembly, a wheel axle assembly and a brake assembly. On one hand, the assembly of the drive axle is thereby simplified and, on the other hand, the assemblies are easier to replace when service is required. The modules can be pre-assembled with pre-set wheel bearings and pre-set brakes, so that no work in this respect has to be performed after installation in the drive axle.

It is further advantageous if the removed axial piston motors in the form of pre-assembled modules can each be fastened together with the control base in a transport housing. All the necessary components and assemblies are then part of an installation or replacement kit.

BRIEF DESCRIPTION OF THE DRAWINGS

Additional advantages and details of the invention are explained in greater detail below with reference to the exemplary embodiment that is illustrated in the accompanying schematic figures, in which:

FIG. 1 is a longitudinal section through a drive axle of the invention;

FIG. 2 is a partial longitudinal section through the drive axle illustrated in FIG. 1;

FIG. 3 is an enlarged detail from a longitudinal section through the central portion of the drive axle;

FIG. 4 is an enlarged detail from a longitudinal section through one variant of the central portion of the drive axle;

FIG. 5 is a section through a control base of the invention;

FIG. 6 is a partial longitudinal section through the drive axle before the final assembly of the axial piston motors; and FIG. 7 is a pre-assembled module of the invention.

DESCRIPTION OF THE PREFERRED EMBODIMENTS

The drive axle of the invention has an axle housing, which is preferably cast and has two tubular terminal segments 1a, which are shaped and fixed in one piece on a central segment 1b. Each terminal segment 1a serves as a housing for an axial piston motor 2 that is realized utilizing the swashplate design.

The two axial piston motors 2 that are located coaxially next to each other are located in the drive axle with control sides facing each other (which is called a "back-to-back" design). In other words, the swashplates of the axial piston motors 2 that produce the stroke are located on the outside, i.e., in the vicinity of the axle ends of the drive axle.

A control base seat 3 is shaped and fixed in one piece inside the central segment 1b of the drive axle. A control base 4 is mounted on each side of the control base seat 3 (in the illustrated embodiment, screwed tight and pinned in position).

As will be seen from FIG. 2, which shows a partial longitudinal section of the drive axle in another sectional plane, on the central segment 1b there are two hydraulic connections 5 which are common to the two axial piston motors 2. From the hydraulic connections 5, connecting channels 6 lead to two fluid-distributing transverse borings 7 in the control base seat 3 which emerge at the control bases 4 and thus connect the axial piston motors 2 in parallel with the hydraulic connections 5.

FIGS. 3 and 4 show possible seals in the planes of separation T between the control base seat 3 and the control bases 4. In this case, in the embodiment illustrated in FIG. 3, there is a metal seal provided across a gap 8. In the embodiment illustrated in FIG. 4, seals 9 made of a soft material and realized in the form of O-rings are provided between the control base seat 3 and the control bases 4 coaxial to the transverse borings 7.

FIG. 5 shows a section through a control base 4. The control base 4 is relatively thick, because the transition from control base channels 10 that are aligned with the transverse borings 7 of the control base seat 3 into control nodules 11 occurs inside the wall thickness of the control base.

FIG. 6 shows an axial piston motor 2 in the form of a pre-assembled module before the final assembly in one of the tubular terminal segments 1b of the drive axle. In this case, the axial piston motor 2 comprises a drive assembly (cylinder block and piston, swashplate, shaft fastening), a wheel axle assembly (wheel axle, wheel bearing, wheel bearing housing, shaft conical nipple) and a brake assembly (brake discs, disc spring, brake pistons).

The wheel bearing and the brakes are already pre-set, so that after the control base 4 has been bolted to the control base seat 3, all that has to be done is to introduce the pre-assembled module into the terminal segment 1b and fasten it in position.

The axial piston motors 2 realized in the form of pre-assembled modules can each be fastened, prior to installation, together with the respective control base 4 in a transport housing 12 to form an installation or replacement kit (See FIG. 7).

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic drive axle, comprising:
   a load-bearing axle housing having two tubular terminal segments and a central segment integrally formed with the tubular terminal segments;
   two coaxial hydrostatic axial piston motors utilizing a swashplate design located next to each other in the axle housing and being pre-assembled modules, each of which has a drive assembly, a wheel axle assembly, and a brake assembly,
   wherein control sides of the axial piston motors face each other,
   wherein the tubular terminal segments of the drive axle are in the form of housings for the axial piston motors, and
   wherein a control base seat that is common to both the axial piston motors is integrally formed with the central segment.

2. The hydrostatic drive axle of claim 1, wherein the central segment includes common hydraulic connections for the two axial piston motors, each of which hydraulic connections is connected to at least one transverse boring in the control base seat and connects the axial piston motors to each other in parallel, wherein on each end of each transverse boring there is a control base channel aligned with the transverse boring, which makes a transition into a control nodule and together with the latter is incorporated into a control base that is held on the control base seat.

3. The hydrostatic drive axle of claim 2, including seals provided in planes of separation between the control base seat and the control bases.

4. The hydrostatic drive axle of claim 2, wherein the control bases are detachably fastened to the control base seat.

5. The hydrostatic drive axle of claim 3, wherein the control bases are detachably fastened to the control base seat.

* * * * *